No. 892,430. PATENTED JULY 7, 1908.
L. H. JENKINS.
SPRING YOKE.
APPLICATION FILED MAY 20, 1907.
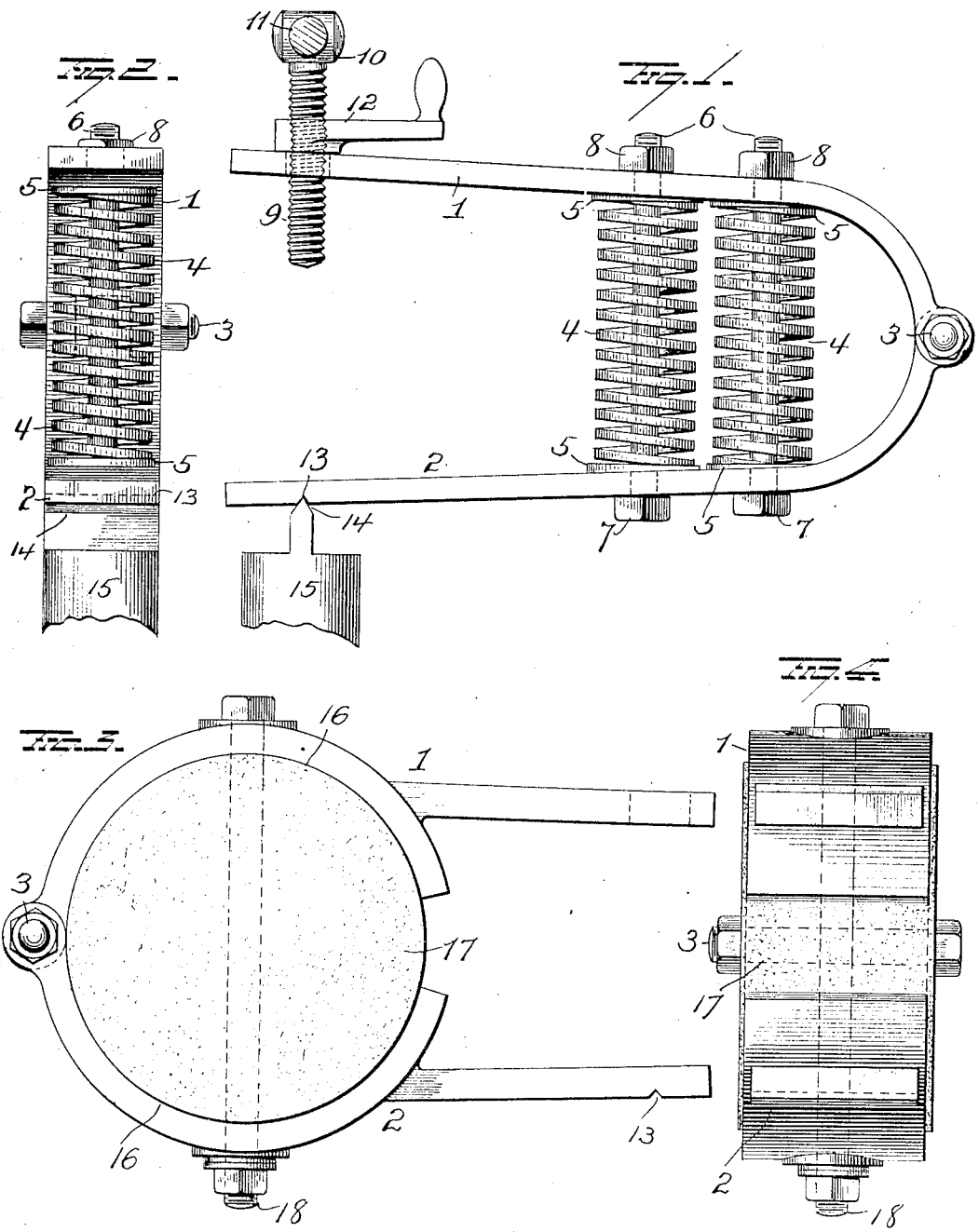
WITNESSES
E. Nottingham
G. F. Downing
INVENTOR
L. H. Jenkins
By H. A. Seymour
Attorney

UNITED STATES PATENT OFFICE.

LEONA HOUSTON JENKINS, OF PHILADELPHIA, PENNSYLVANIA.

SPRING-YOKE.

No. 892,430.   Specification of Letters Patent.   Patented July 7, 1908.

Application filed May 20, 1907. Serial No. 374,671.

*To all whom it may concern:*

Be it known that I, LEONA HOUSTON JENKINS, of Philadelphia, in the county of Philadelphia and State of Pennsylvania, have invented certain new and useful Improvements in Spring-Yokes; and I do hereby declare the following to be a full, clear, and exact description of the invention, such as will enable others skilled in the art to which it appertains to make and use the same.

My invention relates to an improvement in spring yokes, and more particularly to such as are adaptable for use in machines wherein blows or reciprocations in rapid succession are desirable,—such for instance as in rock-drills, trip-hammers, ore stamps, and other spring actuated machines.

The object of my invention is to so construct a spring-actuated yoke that a sufficiently long stroke of one of the members thereof can be effected with a comparatively slight compression of the spring.

A further object is to provide a spring-actuated, power transmitting device, with simple and efficient means for adjusting the tension of the spring or springs.

With these objects in view the invention consists in certain novel features of construction and combinations and arrangements of parts as hereinafter set forth and pointed out in the claims.

In the accompanying drawings, Figure 1 is an elevation of a structure embodying my improvements. Fig. 2 is an end view of the same, and Figs. 3 and 4 show side and end views respectively of a modification.

1, 2, represent stout bars of metal, each curved at one end and pivotally connected together by means of a pin or bolt 3; thus forming a U-shaped yoke. Between the bars or members of this yoke and in proximity to the pivoted ends thereof, stout springs 4 are located and between the ends of these springs and the bars or members of the yoke suitable washers 5 are placed. The springs 4 are held in place by means of rods or bolts 6 passing through them and through holes in the bars or members of the yoke,—each of said rods or bolts being provided at one end with a head 7 and screw-threaded at its other end for the reception of a nut 8, by means of which the tension of the springs can be adjusted. I prefer however to provide means whereby the tension of all the springs can be adjusted at the same time by moving one of the members of the yoke relatively to the other. This adjusting means comprises a screw 9 depending from a collar 10 mounted upon a rod or bar 11, and the lever-nut 12 on said screw and bearing upon the upper member 1 of the yoke, through which member the screw freely passes. These devices not only afford means for adjusting the tension of the springs, but they also provide a support for one end of the yoke, as the rod or bar 11 may be secured in any suitable rigid frame-work. The other end of the yoke may also be supported in suitable frame-work and for this purpose the pin or bolt 3 may be extended laterally from the sides of the yoke.

In the drawings I have shown the yoke provided with two springs but it is evident that a greater number may be employed if desired, or that a single spring might be used.

A hammer head or other tool may be attached to the member 2 of the yoke and said member 2 may be provided in its under face with a notch 13 to receive a knife-edge 14 on a tool 15. The member 2 may be operated by means of a cam or eccentric placed thereunder or by means of a crank and pitman,—said cam or eccentric or the crank and pitman device acting to raise the member 2 of the yoke against the tension of the springs and then suddenly release said member 2 and permit the springs to actuate said member 2 to deliver a blow.

By locating the springs adjacent to the pivoted ends of the yoke members, I am enabled to secure a maximum length of stroke of the free ends of the yoke members with a minimum compression of the springs.

In the form of the invention shown in Figs. 3 and 4, the respective yoke members are provided at their pivoted ends with curved seats 16 for the accommodation of a rubber spring 17 which is maintained under normal tension by means of a bolt 18.

Various slight changes might be made in the details of construction of my invention without departing from the spirit thereof or limiting its scope and hence I do not wish to restrict myself to the precise details herein set forth.

Having fully described my invention what I claim as new and desire to secure by Letters-Patent, is,—

1. A spring yoke of the character described, comprising two members pivotally connected together at one end, a bolt passing through the respective members in proximity to the pivotal connection of said members, and a spring disposed between said members and encircling said bolt.

2. A spring yoke of the character described, comprising two members pivotally connected together at one end, a series of bolts passing through said members in proximity to their pivotal connection with each other, and a series of springs encircling said bolts and located between the pivoted members.

3. The combination with a yoke comprising two members pivotally connected together at one end, a bolt passing through said members in proximity to their pivotal connection with each other a spring disposed between the pivoted members and encircling said bolt, a fixed support a screw projecting from said fixed support, and passing freely through one of said pivoted members, a lever-nut on said screw and bearing against the pivoted member through which the screw freely passes, the other member being free for operating a tool.

In testimony whereof, I have signed this specification in the presence of two subscribing witnesses.

LEONA HOUSTON JENKINS.

Witnesses:
   JOHN W. RITTER,
   WM. H. JENKINS.